United States Patent [19]

Stanley, Sr. et al.

[11] Patent Number: 4,787,338

[45] Date of Patent: Nov. 29, 1988

[54] POULTRY HOUSE CLEANER APPARATUS

[76] Inventors: Walter R. Stanley, Sr., Rt. 1, Box 865, Kountze, Tex. 77625; Walter R. Stanley, Jr., P.O. Box 1179, Sour Lake, Tex. 77659

[21] Appl. No.: 87,880

[22] Filed: Aug. 4, 1987

[51] Int. Cl.$^4$ ............................................. A01K 31/00
[52] U.S. Cl. ....................................... 119/22; 15/93 B
[58] Field of Search ............................ 119/15, 21, 22; 15/93 R, 93 B; 198/498

[56] References Cited

U.S. PATENT DOCUMENTS 3,160,141  12/1964  Crutchfield ........................... 119/22
3,680,166   8/1972  Dyreng ............................. 119/22 X Primary Examiner—Stephen F. Husar
Attorney, Agent, or Firm—Mason, Fenwick & Lawrence

[57] ABSTRACT

Mobile poultry house cleaner apparatus for scraping poultry manure and droppings from elongated parallel floor level receiving pits extending along parallel transversely spaced paths over the length of a poultry house and disposed below rows of overhead poultry cages, wherein floor lanes extend the length of the poultry house between and outwardly of the pits. The apparatus has a transversely elongated main frame transversely spanning substantially the width of the poultry house, pairs of wheels rotatably supported in depending relation from the main frame to track on the outboard floor lanes and an intervening floor lane, a driver's seat and an engine and controls for the engine adjacent the seat surmounted on the main frame, a twin output gear box and shafts powered by the engine for driving a chain sprocket at the opposite ends of the main frame about which a pair of traction chains are trained and anchored to the floor to track along the chains and concurrently drive the opposite ends of the main frame. A plurality of scraper blade assemblies spaced widthwise along the main frame respectively aligned with and extending into the receiving pits are carried by the the main frame to be drawn along respective receiving pits upon movement of the main frame along the length of the poultry house, and remote controlled lift mechanisms are provided for raising the scraper blade assemblies out of contact with the bottom and sides of the associated pits and lowering the same into contact therewith.

20 Claims, 3 Drawing Sheets

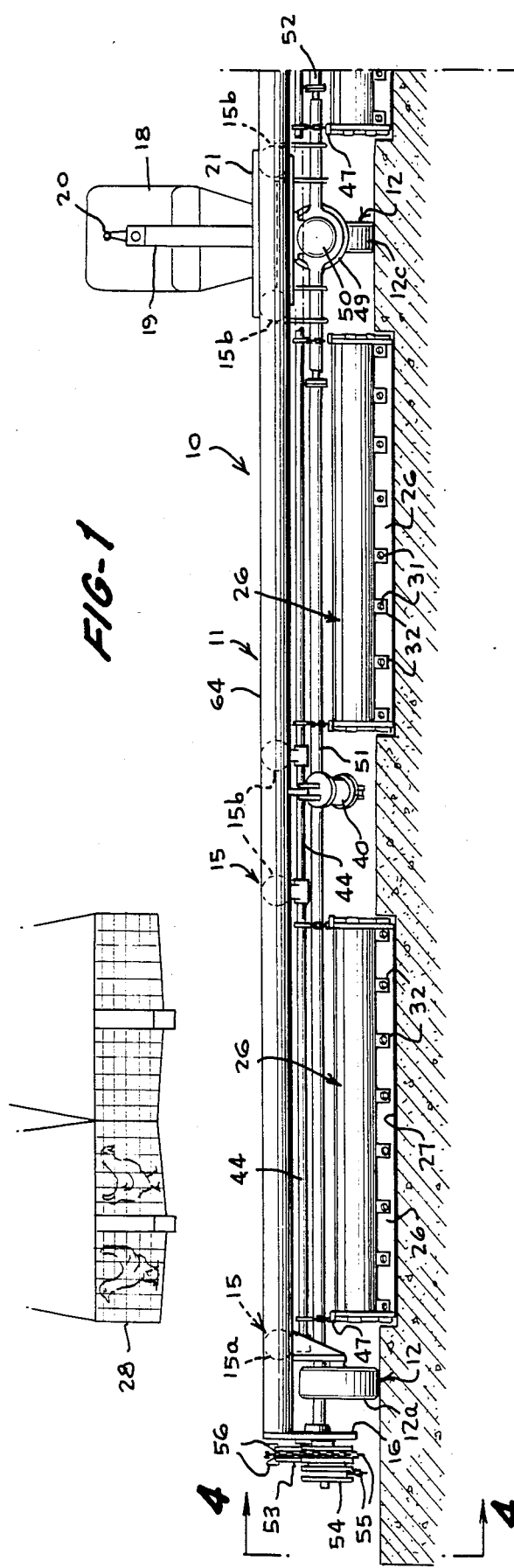
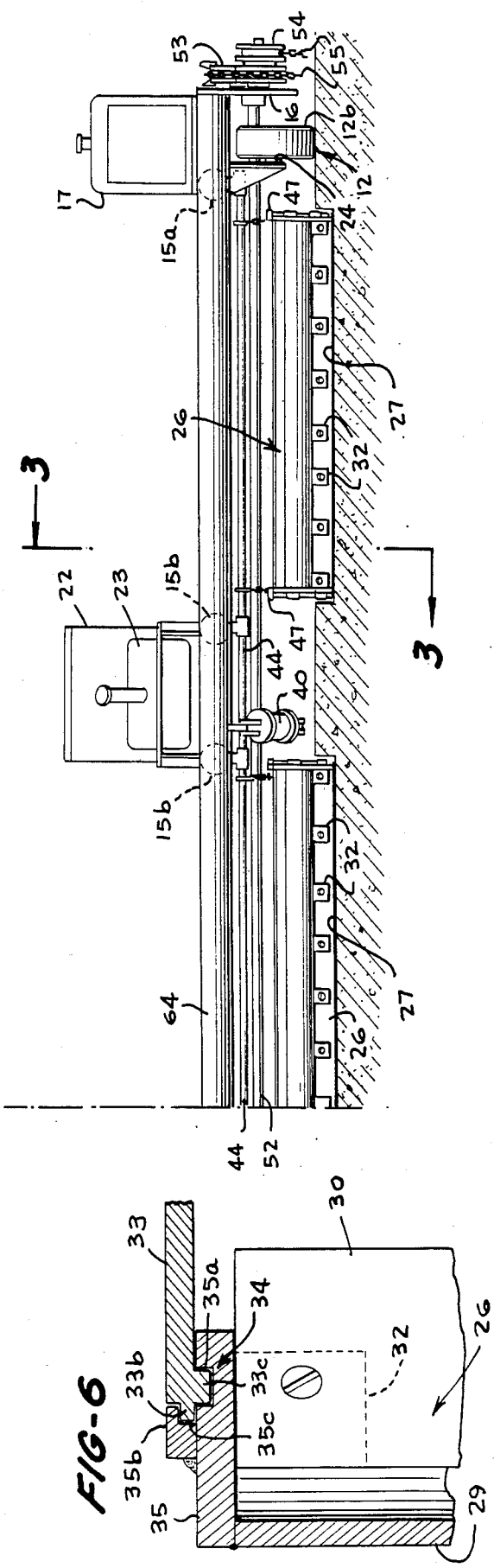
FIG-1
FIG-6

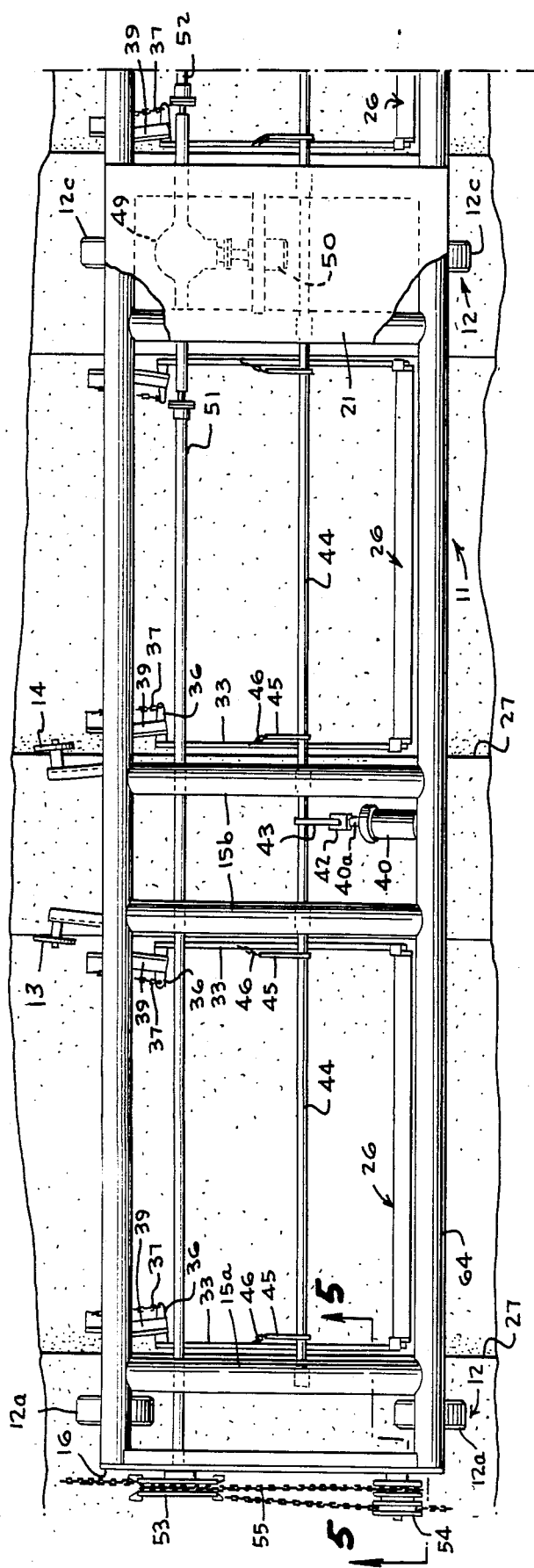
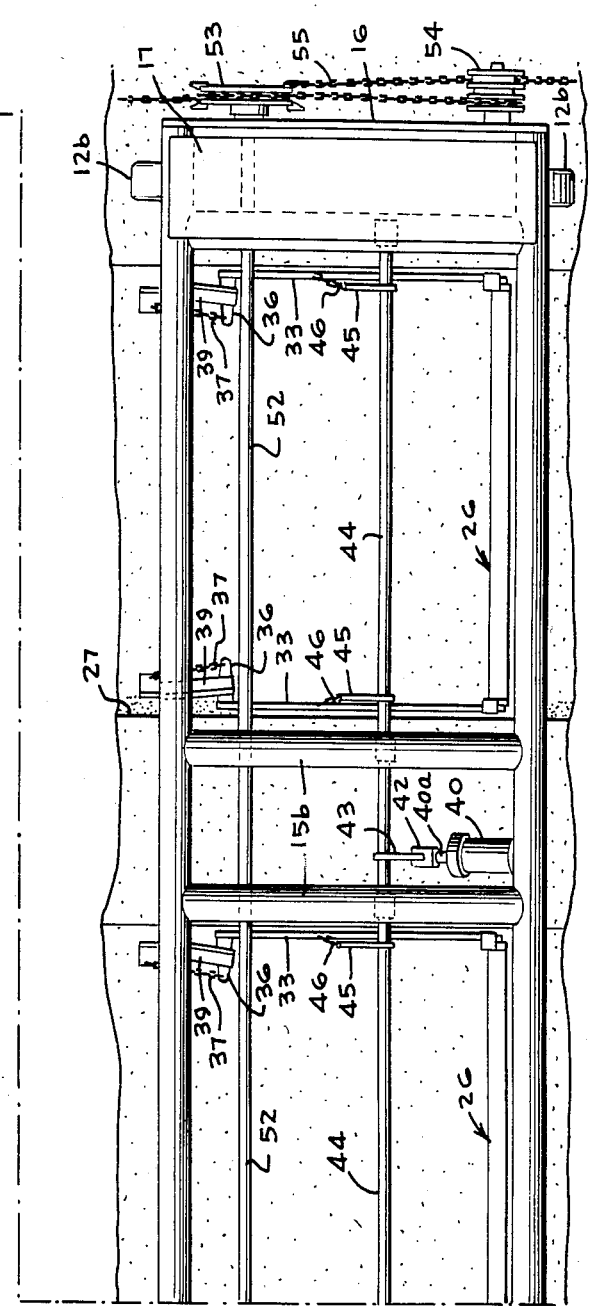
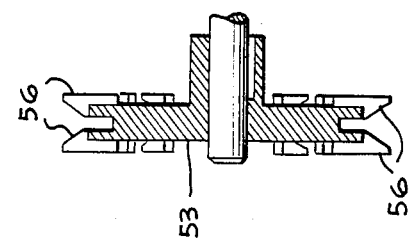

POULTRY HOUSE CLEANER APPARATUS

BACKGROUND AND OBJECTS OF THE INVENTION

The present invention relates in general to apparatus for removing debris from floors in a poultry house or the like, and more particularly to apparatus for scraping poultry manure and similar debris from the floor of a poultry house or the like during one pass along the length of the poultry house.

Poultry houses, such as poultry laying houses and the like, are usually in the form of elongated buildings having a concrete or similar floor with plural rows of poultry receptacles, such as cages or the like, maintained in elevated positions above the floor for easy access by attendants. The cage bottoms are of mesh material and thus droppings and other debris fall through the bottom of the cage or receptacle and onto the floor. In many cases, the floors are arranged with a plurality of elongated shallow rectangular collecting wells or flat bottom troughs, frequently called "pits", extending along parallel axes along the length of the poultry house with pairs or plural pairs of cages or poultry receptacles located above each collecting well or pit.

Prior to development of the poultry house debris removing apparatus of my earlier U.S. Pat. No. 3,625,382, it had been customary to clean beneath the overhanging cages or receptacles manually. The overhanging cages or receptacles made it difficult to readily clean beneath them, and it was necessary for the workers to bend quite low to reach all of the floor area to be cleaned. Of course, after the debris had been gathered from beneath the cages or receptacles, it would then have to be carried out of the poultry house and loaded onto a manure separator, trailer, or other means of removing the manure from the premises.

The poultry floor cleaning apparatus of my earlier U.S. Pat. No. 3,625,382, while representing a considerable improvement over the previously available means for accomplishing this task, nevertheless had the disadvantage of cleaning only one row at a time, by successive filling of a clam shell bucket supported by an extendable boom carried on a tractor or other vehicle device and, after each filling of the clam shell bucket, the operator then needed to drive the tractor or vehicle to the outside of the building and unload the bucket into the trailer or manure spreader for carrying the manure away from the poultry house. This was a very slow operation, with the operator being required to steer the tractor or carrying vehicle and also manipulate the clam shell bucket on a telescopic boom. Also, previous devices devised to attempt to scrape the debris from the floor had difficulty in obtaining adequate traction due to the surface conditions along the floor.

An object of the present invention is the provision of a novel poultry house cleaning apparatus having a plurality of scraper mechanisms for scraping poultry manure and similar debris from beneath plural rows of overhanging poultry cages or containers, capable of cleaning the areas beneath all overhead cage row in the poultry house in one pass along the length of the poultry house.

Another object of the present invention is the provision of an novel poultry house cleaning apparatus as described in the preceding paragraph, having plural scraper structures for scraping the sides and the bottom of rectangular cross-section collecting wells or recessed pits extending along parallel paths along the length of the poultry house.

Another object of the present invention is the provision of an novel poultry house cleaning apparatus as described in the two preceding paragraphs, wherein the scrapers are constructed to allow for variation in the width of the recessed pits or wells in the floor, and have a floating hinge mechanism allowing the scraper edges to maintain full contact with the sides and bottom of the recessed pits.

Another object of the present invention is the provision of novel poultry cleaning house apparatus as described in the preceding paragraphs, having chain means extending lengthwise along the building adjacent the side wall anchored to the building and engaging chain sprockets on the movable scraper mechanism to secure improved traction for transporting the mechanism along the length of the poultry house.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a front elevational view of the poultry house cleaning mechanism of the present invention, with portions of the poultry house floor and some of the overhead suspended cages shown in broken lines;

FIG. 2 is a top plan view with some parts removed;

FIG. 6 is a fragmentary section view of a detail of the joint in the scraper blade side members, taken along the line 6—6 of FIG. 3; and FIG. 7 is a section view of the chain drive sprocket, taken along line 7—7 of FIG. 4.

DETAILED DESCRIPTION OF A PREFERRED EMBODIMENT

Figure 3:
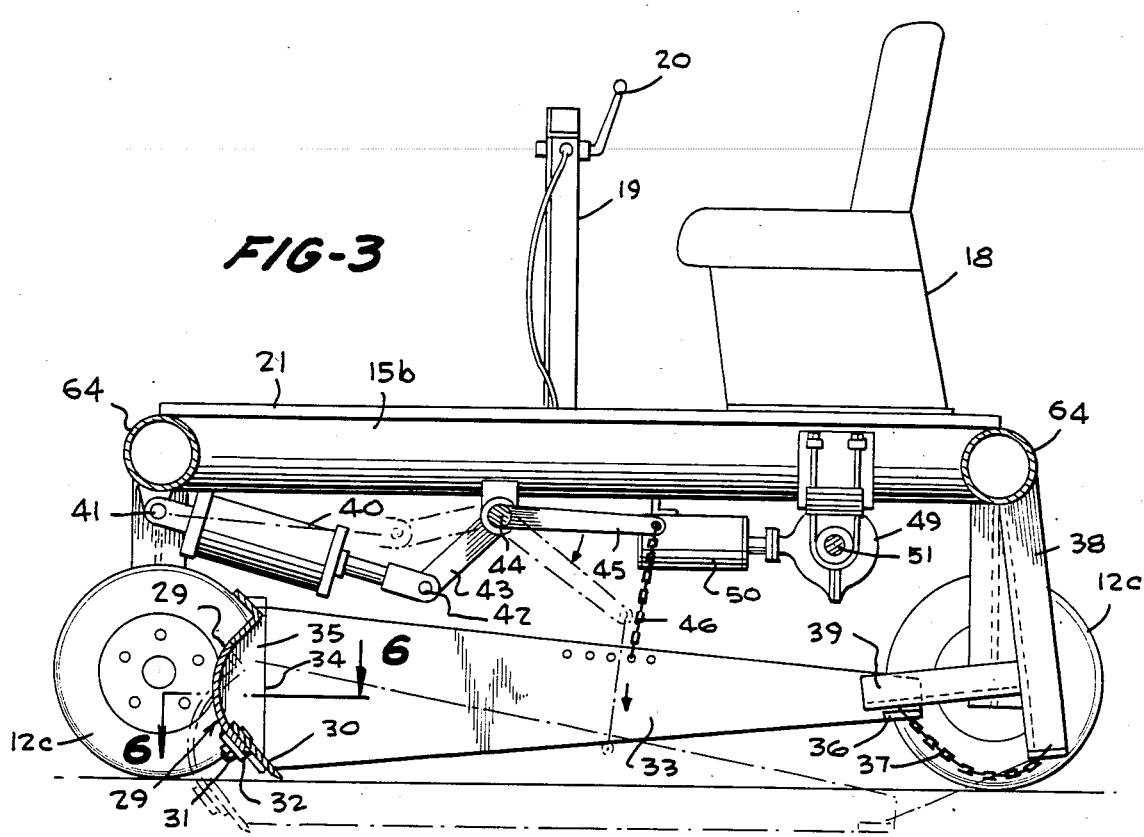
FIG. 3 is a fore and aft section view thereof taken along the line 3—3 of FIG. 2.

Referring to the drawings, wherein like reference characters designate corresponding parts through the several Figures, a poultry housing cleaning apparatus of the present invention, indicated generally by the reference character 10, is designed as a self propelled plural wheel apparatus having a plurality of scraper mechanisms for scraping manure and similar debris from elongated pits or recesses beneath plural rows of overhanging poultry cages, wherein the entire poultry house, which is usually an elongated structure having plural parallel manure receiving pits or rectangular troughs extending the length thereof, can be cleaned in one pass. Specifically, the apparatus as disclosed in FIGS. 1-5 comprises a main frame structure 11 supported on six wheels 12 arranged as two pairs of outboard wheels 12a and 12b, and a central pair of wheels 12c. Additionally, a pair of wheels 13, 14 are provided, designed to maintain the apparatus properly positioned transversely of the poultry house.

The main frame 11 in the illustrated embodiment comprises a pair of main transverse horizontal tubular frame member 64 rigidly tied together by fore-and-aft tubular frame members 15, one of such frame members 15a being provided adjacent each of the opposite lateral ends of the frame structure 11 and three adjacent pairs of such tubular members 15b being provided at the center and substantially mid-way between the center and the outer lateral ends of the frame structure. End plates 16 at the opposite ends of the main frame 11 are also provided, welded to the ends of the elongated transverse main tubular frame members 64. As is illustrated in FIGS. 1 and 2, an engine such as a tractor engine or the like 17 is surmounted on the main frame at one end thereof, for example the right-hand end as viewed in FIG. 1, and an operator's seat 18 and a control mast or console 19 supporting hand controls 20 for the operator in front of the operator's seat 18 are mounted over the fore-and-aft tubular members 15b at the center of the frame structure 11, for example by means of a rectangular floor plate 21 welded to the center fore-and-aft frame members 15b and the adjacent portions of the transverse frame members 64 and supporting the seat 18 and control unit 19. Additionally, a hydraulic tank 22 and gasoline tank 23 may be conveniently supported on an adjacent pair of the fore-and-aft frame members 15b, for example at the location between that of the seat 18 and the engine 17. The outboard wheels 12a, 12b and the center wheel 12c may be conveniently supported by axle members 24 and depending mounting brackets 25 depending from and welded to the adjacent fore-and-aft frame members 15 as shown.

Four scraper blade assemblies, indicated generally by the reference character 26 are provided, at four transversely spaced locations beneath the main frame 11 to protrude downwardly into typical rectangular cross-section elongated manure collecting pits such as indicated at 27, provided along laterally spaced parallel longitudinal paths in the floor, for example, the concrete floor, of the poultry house below paired sets of overhanging cages 28. The four scraper blade assemblies 26 each comprise a forwardly concavely curved backing member 29, for example formed of curved metal plate, having a scraper blade 30 removably mounted, as by bolts 31 to lugs 32 depending from the bottom curved backing member. The backing member is joined at opposite sides by side members 33 having relatively inclined upper and lower edges extending in forwardly convergent relation from a vertical edge forming a joint 34 capable of a slight amount of relative pivotal or hinge movement with end segments 35 welded to the curved blade backing member 29.

The forwardmost end portions of the scraper side members 33 have inwardly projecting ears or lug formations 36 which are coupled by pull chains 37 to the lowermost end of depending mounting arms 38, for example formed of angle iron members. A lift stop bracket 39 projects rearwardly from each arm 38 to a location above the lug or ear 36 of the adjacent side member 33 of the scraper to limit upward travel of the front end of the scraper assembly as later described. As will be seen from the fragmentary section view of FIG. 6, the hinge-like vertical joint 34 is formed by providing a recess or kerf 35a in each end segment 35 of each blade backing member 29 into which a protrusion 33a of similar configuration extends from the side member 33, which is operated in the recess 35a by one or more retainer blocks 35b welded to the end segments 35 and having a recess 35c into which a projection 33b at the rearmost end of each side member 33 protrudes.

The scraper blade assemblies 26 are lifted in sets of twos, two located to the right of the center or operator's seat position and two blade assemblies to the left of that position. The blade sets are powered by a hydraulic cylinder 40 pivotally mounted by pin 41 to the main frame 11 and its piston rod 40a is attached by pin 42 to a lever 43 rotatably carried by the fore-and-aft tubular frame members 15b of the main frame 11. The lever 43 is fixed to a shaft 44 journaled on brackets depending from the last mentioned frame members 15b, with two sets of lifting arms 45 projecting rigidly from the shaft 44 at locations generally above the side members 33 of the two scraper blade assemblies 26 of the associated side of the apparatus. Chains 46 are attached to the lift arms 45 and the scraper blade sides 33 as shown.

From FIG. 3, it will be seen that the forward or front portion of the scraper blade assembly sides 33, when the hydraulic cylinder 40 is activated to raise the lift arms 45, will raise chains 46 and the front portion of sides 33 to bring the ears or lugs 36 into abutment with the stop brackets 39. When the pull chains 37 arrest further rearward movement of the scraper blade structure, further lifting of the lift chains 46 will raise the rear or back of the scraper blade side members 33 and the scraper blade 26 and blade backing member 39 attached thereto until the stop block 47 welded to the top of the end segments 35 of the backing member 29 is contacted by the upper edge of the associated side member 33, so that upon further movement of the lift chain 46, the blade 30 and backing member 29 will be raised off of the bottom of the associated pit 27.

Mobility of the apparatus along the length of the poultry house from one end of the plurality of a elongated parallel pits (27 to the other end, is achieved by twin output gear box 49 driven by a hydraulic motor 50 coupled with the hydraulic tank 22 and an associated control hydraulic pump, and a control valve system in the hand control mast or unit 19. The twin output gear boxes 49 drive output shafts 51 and 52 having two chain sprockets 53 attached at the ends of the output shafts 51, 52, the output shafts 51 and 52 being journaled in suitable bearings in the end plates 16. Also, journaled for rotation in bearings in the end plates 16 are idler pulleys 54 coactive to receive one of two traction chains 55 trained about one of the idle pulleys 54 and the chain sprocket 53 at the associated end of the main frame 11. The traction chains 55 are two pieces of chain each cut to the length of the poultry housing building and anchored at each end of the chain to the building floor, located next to the wall of the building.

Figure 4:
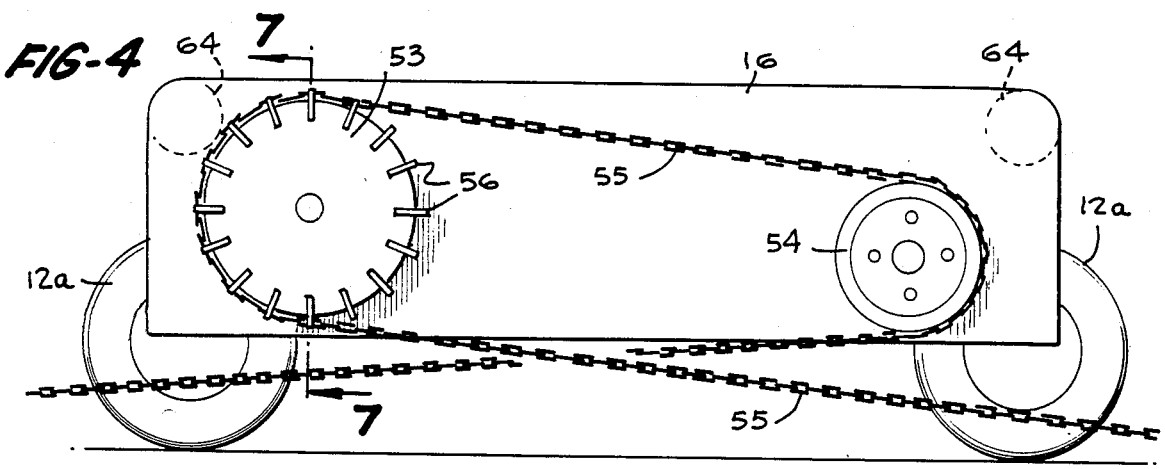
FIG. 4 is a fragmentary end elevational view showing the end portions and change sprocket and drive mechanisms, and portions of the traction chain, employed in the present invention, taken along the line 4—4 of FIG. 2.
Figure 5:
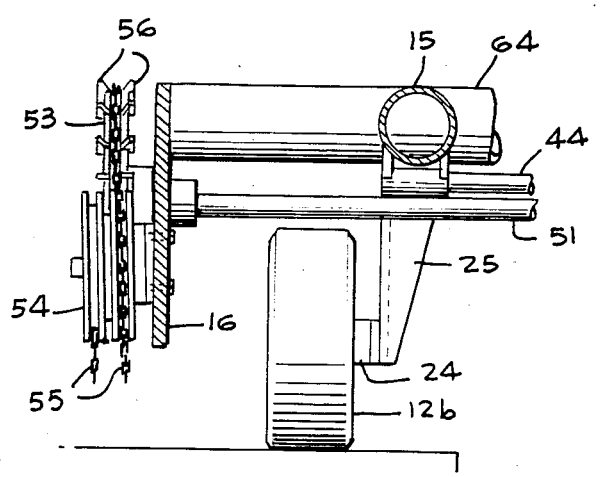
FIG. 5 is a fragmentary vertical section view of an end portion of the poultry house cleaning apparatus, taken along the line 5—5 of FIG. 2.

As shown in FIG. 4, the chain 55 at each side of the building is trained about the sprocket 53 and the idler pulley 54 at the adjacent end of the main frame of the apparatus, so that when the output drive shafts 51 and 52 are driven by the hydraulic motor 50, the two opposite lateral ends of the apparatus track up and down the length of the building concurrently and in straight lines to draw the scraper blade 30 along the bottom surfaces of the pits 27. The sprocket 53 as shown includes radial guard members 56, of the configuration shown in FIG. 7, which securely sprockets wire link chain without slipping or fouling and without derailing of the chain from the sprocket. The sprocket also easily drives worn chain, damaged chain or heavy manure coated chain, or even twisted chain without derailing of the chain.

By this arrangement, one is provided with apparatus which provides the ability to clean an entire poultry house with one apparatus, cleaning the pits below all rows of cages at one time. The scraper blades scrape the sides of the associated pit or manure collecting recess as well as the bottom of the pit. Because of the floating hinge joint provided between the sides and backing member of the scraper blade assemblies independent movement of the two sides relative to the back edge is allowed, to insure effective scraping contact notwithstanding small variations in pit width or flatness.

I claim:

1. Mobile poultry house cleaner apparatus for scraping poultry manure and droppings from elongated parallel floor level receiving pits extending along parallel transversely spaced paths over the length of an elongated poultry house and disposed below rows of overhead poultry cages, the elongated receiving floor pits being of substantially rectangular cross-sectional configuration corresponding to the width of the cages of the associated row with intervening and flanking floor surface lanes coextensive longitudinally with and located between an outboard of the the pits, the apparatus comprising a transversely elongated main frame transversely spanning substantially the width of the poultry house having opposite ends to overlie the flanking floor lanes and a central portion overlying an intervening floor lane, a respective pair of wheels rotatably supported in depending relation from said main frame adjacent said opposite ends and said central portion forming plural pairs of outboard wheels to track on a plurality of said lanes, a driver's station and an engine and control therefor adjacent said station each surmounted on said main frame, output gear box means driven by drive means powered by the engine and having output shafts extending therefrom driving a chain sprocket at each of the opposite ends of the main frame, a pair of traction chains respectively located adjacent said opposite ends extending the length of the poultry house at floor level and anchored at opposite ends thereof to the building floor adjacent side walls of the poultry house, the chains being trained about said chain sprockets whereby rotation of the chain sprockets driven by said output shafts causes the sprocket to track along the chains and concurrently drive the opposite ends of the main frame to translate the main frame the length of the poultry house while maintaining predetermined transverse alignment relative to the receiving pits, and a plurality of scraper blade assemblies spaced widthwise along the main frame respectively aligned with and extending into the receiving pits, means to draw the scraper assemblies along their respective receiving pits upon movement of the main frame along the length of the poultry house, and remote controlled lift means for raising the scraper blade assemblies out of contact with the bottom and sides of the associated pits and lowering the same into contact therewith.

2. Mobile poultry house cleaner apparatus as defined in claim 1, wherein said scraper blade assemblies for each pit each include a concavely curved scraper blade portion and a pair of side portions extending forwardly therefrom to lie substantially parallel to and closely adjacent sides of the pits and joined to the blade portion for limited relative pivotal movement about vertical pivot axes, permitting angular displacement of the blade portion relative to said side portions and the sides of the pits to interfit into pits of various widths.

3. Mobile poultry house cleaner apparatus as defined in (claim 1, including means coupling front portions of the side portions of the scraper blade assemblies to the main frame to draw the scraper assemblies along respective floor pits upon movement of the main frame along the length of the poultry house, and said remote controlled lift means being coupled to said side portions of the scraper blade assemblies at locations spaced rearwardly from the front portions thereof controllable from the operator's station for raising the scraper blade assemblies out of contact with the bottom and sides of the associated pits and lowering the same into contact therewith.

4. Mobile poultry house cleaner apparatus as defined in claim 2, including means coupling front portions of the side portions of the scraper blade assemblies to the main frame to draw the scraper assemblies along respective floor pits upon movement of the main frame along the length of the poultry house, and said remote controlled lift means being coupled to said side portions of the scraper blade assemblies at locations spaced rearwardly from the front portions thereof controllable from the operator's station for raising the scraper blade assemblies out of contact with the bottom and sides of the associated pits and lowering the same into contact therewith.

5. Mobile poultry house cleaner apparatus as defined in claim 2, wherein said side portions of the scraper blade assemblies are of substantially truncated triangular configuration having forwardly convergent top and bottom edges and said concavely curved blade portion has end members shaped as segments of a circle having a chord edge hingedly adjoining the rearmost edge of a respective one of said portions.

6. Mobile poultry house cleaner apparatus as defined in claim 4, wherein said side portions of the scraper blade assemblies are of substantially truncated triangular configuration having forwardly convergent top and bottom edges and said concavely curved blade portion has end members shaped as segments of a circle having a chord edge hingedly adjoining the rearmost edge of a respective one of said portions.

7. Mobile poultry house cleaner apparatus as defined in claim 1 wherein said scraper blade assemblies include a chain member connected to a front portion of each side portion and anchor means therefor linking the front portion to said main frame to draw the blade assemblies along the pits and limit rearward movement thereof during raising of the same, and abutment means restricting upward movement of said front portion defining a pivot axis therefor during raising of the blade assemblies.

8. Mobile poultry house cleaner apparatus as defined in claim 2 wherein said scraper blade assemblies include a chain member connected to a front portion of each side portion and anchor means therefor linking the front portion to said main frame to draw the blade assemblies along the pits and limit rearward movement thereof during raising of the same, and abutment means restricting upward movement of said front portion defining a pivot axis therefor during raising of the blade assemblies.

9. Mobile poultry house cleaner apparatus as defined in claim 3 wherein said scraper blade assemblies include a chain member connected to a front portion of each side portion and anchor means therefor linking the front portion to said main frame to draw the blade assemblies along the pits and limit rearward movement thereof during raising of the same, and abutment means restricting upward movement of said front portion defining a pivot axis therefor during raising of the blade assemblies.

10. Mobile poultry house cleaner apparatus as defined in claim 4 wherein said scraper blade assemblies include a chain member connected to a front portion of each side portion and (anchor means therefor linking the front portion to said main frame to draw the blade assemblies along the pits and limit rearward movement thereof during raising of the same, and (abutment means restricting upward movement of said front portion defining a pivot axis therefor during raising of the blade assemblies.

11. Mobile poultry house cleaner apparatus as defined in claim 5 wherein said scraper blade assemblies include a chain member connected to a front portion of each side portion and anchor means therefor linking the front portion to said main frame to draw the blade assemblies along the pits and limit rearward movement thereof during raising of the same, and abutment means restricting upward movement of said front portion defining a pivot axis therefor during raising of the blade assemblies.

12. Mobile poultry house cleaner apparatus as defined in claim 6 wherein said scraper blade assemblies include a chain member connected to a front portion of each side portion and anchor means therefor linking the front portion to said main frame to draw the blade assemblies along the pits and limit rearward movement thereof during raising of the same, and abutment means restricting upward movement of said front portion defining a pivot axis therefor during raising of the blade assemblies.

13. Mobile poultry house cleaner apparatus as defined in claim 1, wherein said scraper blade assemblies comprise a concavely curved blade backing member and a removable blade member releasably supported at the lower edge thereof having a straight edge for engaging and spanning the width of the bottom of the associated receiving pit.

14. Mobile poultry house cleaner apparatus as defined in claim 4, wherein said scraper blade assemblies comprise a concavely curved blade backing member and a removable blade member releasably supported at the lower edge thereof having a straight edge for engaging and spanning the width of the bottom of the associated receiving pit.

15. Mobile poultry house cleaner apparatus as defined in claim 7, wherein said scraper blade assemblies comprise a concavely curved blade backing member and a removable blade member releasably supported at the lower edge thereof having a straight edge for engaging and spanning the width of the bottom of the associated receiving pit.

16. Mobile poultry house cleaner apparatus as defined in claim 10, wherein said scraper blade assemblies comprise a concavely curved blade backing member and a removable blade member releasably supported at the lower edge thereof having a straight edge for engaging and spanning the width of the bottom of the associated receiving pit.

17. Mobile poultry house cleaner apparatus as defined in claim 1, wherein the end portions of said main frame include an end plate disposed vertically and providing bearings for journalling said chain sprockets, each end portion having an idler wheel also journaled in the associated end plate spaced in a fore-and-aft direction from the associated chain sprocket, and the respective associated chain being trained about the chain sprocket and its associated idler wheel at each respective end of the main frame.

18. Mobile poultry house cleaner apparatus as defined in claim 4, wherein the end portions of said main frame include an end plate disposed vertically and providing bearings for journalling said chain sprockets, each end portion having an idler wheel also journaled in the associated end plate spaced in a fore-and-aft direction from the associated chain sprocket, and the respective associated chain being trained about the chain sprocket and its associated idler wheel at each respective end of the main frame.

19. Mobile poultry house cleaner apparatus as defined in claim 7, wherein the end portions of said main frame include an end plate disposed vertically and providing bearings for journalling said chain sprockets, each end portion having an idler wheel also journaled in the associated end plate spaced in a fore-and-aft direction from the associated chain sprocket, and the respective associated chain being trained about the chain sprocket and its associated idler wheel at each respective end of the main frame.

20. Mobile poultry house cleaner apparatus as defined in claim 10, wherein the end portions of said main frame include an end plate disposed vertically and providing bearings for journalling said chain sprockets, each end portion having an idler wheel also journaled in the associated end plate spaced in a fore-and-aft direction from the associated chain sprocket, and the respective associated chain being trained about the chain sprocket and its associated idler wheel at each respective end of the main frame.

* * * * *